United States Patent
Sugihara

(10) Patent No.: US 12,525,425 B2
(45) Date of Patent: Jan. 13, 2026

(54) PATTERN INSPECTION APPARATUS, AND METHOD FOR ACQUIRING ALIGNMENT AMOUNT BETWEEN OUTLINES

(71) Applicant: NuFlare Technology, Inc., Yokohama (JP)

(72) Inventor: Shinji Sugihara, Ota-ku (JP)

(73) Assignee: NuFlare Technology, Inc., Yokohama (JP)

( * ) Notice: Subject to any disclaimer, the term of this patent is extended or adjusted under 35 U.S.C. 154(b) by 454 days.

(21) Appl. No.: 18/148,588

(22) Filed: Dec. 30, 2022

(65) Prior Publication Data

US 2023/0145411 A1    May 11, 2023

Related U.S. Application Data

(63) Continuation of application No. PCT/JP2021/018380, filed on May 14, 2021.

(30) Foreign Application Priority Data

Jul. 29, 2020  (JP) ................................ 2020-128134

(51) Int. Cl.
*H01J 37/22* (2006.01)
*G01N 23/2251* (2018.01)
(Continued)

(52) U.S. Cl.
CPC ........ *H01J 37/222* (2013.01); *G01N 23/2251* (2013.01); *G06T 7/001* (2013.01);
(Continued)

(58) Field of Classification Search
CPC ......... G01N 23/2251; G01N 2223/401; G01N 21/956; H01J 37/222; H01J 37/244;
(Continued)

(56) References Cited

U.S. PATENT DOCUMENTS 5,844,809 A * 12/1998 Yamashita ............... G06T 11/40
716/55
6,356,300 B1 * 3/2002 Shiba ...................... G06T 7/001
348/130
(Continued)

FOREIGN PATENT DOCUMENTS

JP   2007079982 A * 3/2007 ......... G06V 10/7515
JP   2011-48592       3/2011
(Continued)

OTHER PUBLICATIONS

T. Hiroi, S. Maeda, H. Kubota, K. Watanabe and Y. Nakagawa, "Precise visual inspection for LSI wafer patterns using subpixel image alignment," Proceedings of 1994 IEEE Workshop on Applications of Computer Vision, Sarasota, FL, USA, 1994, pp. 26-34, doi: 10.1109/ACV.1994.341284. (Year: 1994).*
(Continued)

*Primary Examiner* — Chan S Park
*Assistant Examiner* — Paulo Andres Garcia
(74) *Attorney, Agent, or Firm* — Oblon, McClelland, Maier & Neustadt, L.L.P.

(57) ABSTRACT

A pattern inspection apparatus includes an actual outline image generation circuit to generate an actual outline image of a predetermined region defined by a function, where the gray scale value of each pixel in the predetermined region including plural actual image outline positions on an actual image outline of a figure pattern in an inspection image is dependent on a distance from the center of a pixel concerned to the closest actual image outline position in the plural actual image outline positions, and a reference outline image generation circuit to generate a reference outline image of the predetermined region defined by the function, where a gray scale value of each pixel in the predetermined region is dependent on a distance from the center of a pixel concerned to the closest reference outline position in plural reference
(Continued)

outline positions on a reference outline to be compared with the actual image outline.

8 Claims, 16 Drawing Sheets

(51) Int. Cl.
    *G06T 7/00*          (2017.01)
    *G06T 7/33*          (2017.01)
    *H01J 37/09*         (2006.01)
    *H01J 37/244*       (2006.01)
    *H01J 37/28*         (2006.01)

(52) U.S. Cl.
    CPC ............ *G06T 7/337* (2017.01); *H01J 37/244* (2013.01); *G01N 2223/401* (2013.01); *G06T 2207/30148* (2013.01); *H01J 37/09* (2013.01); *H01J 37/28* (2013.01); *H01J 2237/0453* (2013.01); *H01J 2237/226* (2013.01); *H01J 2237/2617* (2013.01); *H01J 2237/2817* (2013.01)

(58) Field of Classification Search
    CPC .... H01J 37/09; H01J 37/28; H01J 2237/0453; H01J 2237/226; H01J 2237/2617; H01J 2237/2817; H01J 2237/221; H01J 2237/28; G06T 7/001; G06T 7/337; G06T 2207/30148; G06T 1/00
    See application file for complete search history.

(56) References Cited

U.S. PATENT DOCUMENTS

| | | | |
|---|---|---|---|
| 9,875,536 B2 * | 1/2018 | Konecky | ................. G06T 7/001 |
| 2004/0264760 A1 * | 12/2004 | Ishikawa | ............... G06T 7/0004 |
| | | | 382/145 |
| 2018/0080883 A1 * | 3/2018 | Wu | ..................... G01N 21/8806 |
| 2019/0026879 A1 * | 1/2019 | Batikoff | .................... G06T 5/50 |
| 2019/0066286 A1 * | 2/2019 | Shiratsuchi | ............. G06T 7/001 |
| 2019/0206024 A1 * | 7/2019 | He | .......................... G06T 3/403 |
| 2022/0013327 A1 | 1/2022 | Sugihara | |

FOREIGN PATENT DOCUMENTS

| | | | | |
|---|---|---|---|---|
| JP | 2022-16779 | | 1/2022 | |
| WO | WO-2016047383 A1 * | | 3/2016 | ............. H04N 25/61 |

OTHER PUBLICATIONS

International Search Report issued Aug. 10, 2021 in PCT/JP2021/018380 filed May 14, 2021, 3 pages.

Office Action issued Nov. 7, 2023, in corresponding Japanese Patent Application No. 2020-128134 (with English Translation), 6 pages.

\* cited by examiner

IMAGE OF CONVENTIONAL EXAMPLE (RECTANGLE + AVERAGE OF THREE PIXELS)
DISCONTINUOUS DIFFERENTIATION

IMAGE OF CONVENTIONAL EXAMPLE (RECTANGLE + AVERAGE OF THREE PIXELS)

WORST VALUE:
ERROR: 0.0695 (pix)

PATTERN INSPECTION APPARATUS, AND METHOD FOR ACQUIRING ALIGNMENT AMOUNT BETWEEN OUTLINES

CROSS-REFERENCE TO RELATED APPLICATION

This application is a continuation application based upon and claims the benefit of priority from prior Japanese Patent Application No. 2020-128134 (application number) filed on Jul. 29, 2020 in Japan, and International Application PCT/JP2021/018380, the International Filing Date of which is May 14, 2021. The contents described in JP2020-128134 and PCT/JP2021/018380 are incorporated herein by reference.

BACKGROUND OF THE INVENTION

Field of the Invention

An embodiment of the present invention relates to an apparatus for inspecting patterns and a method for acquiring an alignment amount between outlines. For example, it relates to an inspection apparatus that performs inspection using a secondary electron image of a pattern emitted from the substrate irradiated with multiple electron beams, an inspection apparatus that performs inspection using an optical image of a pattern acquired from the substrate irradiated with ultraviolet rays, and a method for acquiring an alignment amount between outlines to be used for inspection.

Description of Related Art

In recent years, with advances in high integration and large capacity of the LSI (Large Scale Integrated circuits), the circuit line width required for semiconductor elements is becoming increasingly narrower. Because the LSI manufacturing requires an enormous production cost, it is essential to improve the yield. However, since patterns that make up the LSI have reached the order of 10 nanometers or less, dimensions to be detected as a pattern defect have become extremely small. Therefore, the pattern inspection apparatus for inspecting defects of ultrafine patterns exposed/transferred onto a semiconductor wafer needs to be highly accurate. Further, one of major factors that decrease the yield is due to pattern defects on the mask used for exposing/transferring ultrafine patterns onto a semiconductor wafer by the photolithography technology. Accordingly, the pattern inspection apparatus for inspecting defects on an exposure transfer mask used in manufacturing LSI needs to be highly accurate.

As a defect inspection method, there is known a method of comparing a measured image acquired by imaging a pattern formed on a substrate, such as a semiconductor wafer or a lithography mask, with design data or with another measured image acquired by imaging an identical pattern on the substrate. For example, as a pattern inspection method, there are "die-to-die inspection" and "die-to-database inspection". The "die-to-die inspection" method compares data of measured images acquired by imaging identical patterns at different positions on the same substrate. The "die-to-database inspection" method generates, based on design data of a pattern, design image data (reference image), and compares it with a measured image being measured data acquired by imaging the pattern. Acquired images are transmitted as measured data to a comparison circuit. After performing an alignment between the images, the comparison circuit compares the measured data with reference data according to an appropriate algorithm, and determines that there is a pattern defect if the compared data do not match each other.

With respect to the pattern inspection apparatus described above, in addition to the apparatus that irradiates an inspection target substrate with laser beams in order to obtain a transmission image or a reflection image, there has been developed another inspection apparatus that acquires a pattern image by scanning an inspection target substrate with primary electron beams and detecting secondary electrons emitted from the inspection target substrate due to the irradiation with the primary electron beams. For such pattern inspection apparatus, it has been examined, instead of comparing pixel values, to extract an outline (contour line) of a pattern in an image, and use a positional relationship between the extracted outline and the outline of a reference image, as a determining index. For accurately comparing positions of outlines, it is necessary to perform an alignment with high precision between an outline of an inspection image and a reference outline. However, alignment processing between outlines is complicated compared with conventional alignment processing between images which minimizes a deviation in a luminance value of a pixel in each image by a least squares method, and thus, there is a problem that the processing takes a long time to perform a high-precision alignment.

The following method has been disclosed as a method for extracting an outline position on an outline, which is performed before alignment processing. In the disclosed method, edge candidates are obtained using a Sobel filter, etc., and then, a second differential value of a concentration value is calculated for each pixel of the edge candidates and adjacent pixels in the inspection region. Further, in two pixel groups adjacent to the edge candidates, one of the adjacent pixel groups which has a greater number of combinations of different signs of second differential values is selected as a pixel group of the second edge candidates. Then, using the second differential value of the edge candidate and that of the second edge candidate, edge coordinates of a detection target edge are obtained for each sub-pixel (e.g., refer to Japanese Patent Application Laid-open (JP-A) No. 2011-48592).

BRIEF SUMMARY OF THE INVENTION

According to one aspect of the present invention, a pattern inspection apparatus includes
  an image acquisition mechanism configured to acquire an inspection image of a substrate on which a figure pattern is formed;
  an actual outline image generation circuit configured to generate an actual outline image of a predetermined region defined by a predetermined function, in which a gray scale value of each pixel in the predetermined region including a plurality of actual image outline positions on an actual image outline of the figure pattern in the inspection image is dependent on a distance from a center of a pixel concerned to a closest actual image outline position in the plurality of actual image outline positions;
  a reference outline image generation circuit configured to generate a reference outline image of the predetermined region defined by the predetermined function, in which a gray scale value of each pixel in the predetermined region is dependent on a distance from a center of a pixel concerned to a closest reference outline position in a plurality of reference outline positions on a reference outline to be compared with the actual image outline;

an alignment amount calculation circuit configured to calculate an alignment amount for performing alignment between the actual outline image and the reference outline image by using a gray scale difference between the actual outline image and the reference outline image; and a comparison circuit configured to compare the actual image outline with the reference outline by using the alignment amount.

According to another aspect of the present invention, a method for acquiring an alignment amount between outlines includes acquiring an inspection image of a substrate on which a figure pattern is formed;

generating an actual outline image of a predetermined region defined by a predetermined function, in which a gray scale value of each pixel in the predetermined region including a plurality of actual image outline positions on an actual image outline of the figure pattern in the inspection image is dependent on a distance from a center of a pixel concerned to a closest actual image outline position in the plurality of actual image outline positions;

generating a reference outline image of the predetermined region defined by the predetermined function, in which a gray scale value of each pixel in the predetermined region is dependent on a distance from a center of a pixel concerned to a closest reference outline position in a plurality of reference outline positions on a reference outline to be compared with the actual image outline; and calculating an alignment amount for performing alignment between the actual outline image and the reference outline image by using a gray scale difference between the actual outline image and the reference outline image, and outputting a result.

DETAILED DESCRIPTION OF THE INVENTION

Embodiments of the present invention provide an apparatus and method that can acquire a highly precise alignment amount while suppressing the processing time.

First Embodiment

The embodiments below describe an electron beam inspection apparatus as an example of a pattern inspection apparatus. However, it is not limited thereto. For example, the inspection apparatus may be the one in which the inspection substrate, to be inspected, is irradiated with ultraviolet rays to obtain an inspection image using a light transmitted through the inspection substrate or reflected therefrom. Further, the embodiments below describe an inspection apparatus using multiple electron beams to acquire an image, but it is not limited thereto. The inspection apparatus using a single electron beam to acquire an image may also be employed.

Figure 1:
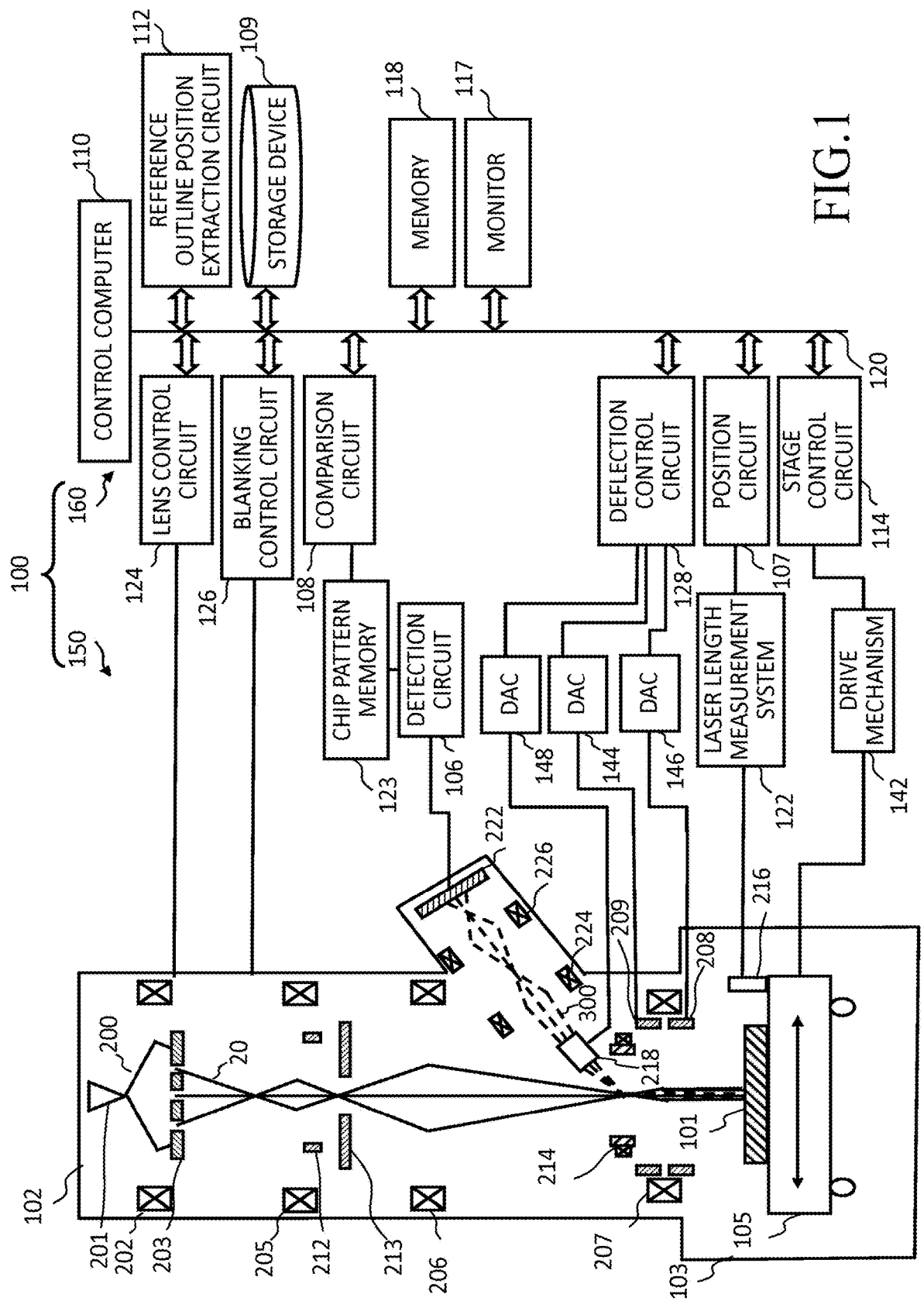
FIG. 1 is a diagram showing an example of a configuration of a pattern inspection apparatus according to a first embodiment.

FIG. 1 is a diagram showing an example of a configuration of a pattern inspection apparatus according to a first embodiment. In FIG. 1, an inspection apparatus 100 for inspecting a pattern formed on the substrate is an example of a multi-electron beam inspection apparatus. The inspection apparatus 100 includes an image acquisition mechanism 150 (secondary electron image acquisition mechanism) and a control system circuit 160. The image acquisition mechanism 150 includes an electron beam column 102 (electron optical column) and an inspection chamber 103. In the electron beam column 102, there are disposed an electron gun 201, an electromagnetic lens 202, a shaping aperture array substrate 203, an electromagnetic lens 205, a collective blanking deflector 212, a limiting aperture substrate 213, an electromagnetic lens 206, an electromagnetic lens 207 (objective lens), a main deflector 208, a sub deflector 209, an E×B separator 214 (beam separator), a deflector 218, an electromagnetic lens 224, an electromagnetic lens 226, and a multi-detector 222. In the case of FIG. 1, a primary electron optical system which irradiates a substrate 101 with multiple primary electron beams is composed of the electron gun 201, the electromagnetic lens 202, the shaping aperture array substrate 203, the electromagnetic lens 205, the collective blanking deflector 212, the limiting aperture substrate 213, the electromagnetic lens 206, the electromagnetic lens 207 (objective lens), the main deflector 208, and the sub deflector 209. A secondary electron optical system which irradiates the multi-detector 222 with multiple secondary electron beams is composed of the ExB separator 214, the deflector 218, the electromagnetic lens 224, and the electromagnetic lens 226.

In the inspection chamber 103, there is disposed a stage 105 movable at least in the x and y directions. The substrate 101 (target object) to be inspected is mounted on the stage 105. The substrate 101 may be an exposure mask substrate, or a semiconductor substrate such as a silicon wafer. In the case of the substrate 101 being a semiconductor substrate, a plurality of chip patterns (wafer dies) are formed on the semiconductor substrate. In the case of the substrate 101 being an exposure mask substrate, a chip pattern is formed on the exposure mask substrate. The chip pattern is composed of a plurality of figure patterns. When the chip pattern formed on the exposure mask substrate is exposed/transferred onto the semiconductor substrate a plurality of times, a plurality of chip patterns (wafer dies) are formed on the semiconductor substrate. The case of the substrate 101 being a semiconductor substrate is mainly described below. The substrate 101 is placed, with its pattern-forming surface facing upward, on the stage 105, for example. Further, on the stage 105, there is disposed a mirror 216 which reflects a laser beam for measuring a laser length emitted from a laser length measuring system 122 arranged outside the inspection chamber 103. The multi-detector 222 is connected, at the outside of the electron beam column 102, to a detection circuit 106.

In the control system circuit 160, a control computer 110 which controls the whole of the inspection apparatus 100 is connected, through a bus 120, to a position circuit 107, a comparison circuit 108, a reference outline position extraction circuit 112, a stage control circuit 114, a lens control circuit 124, a blanking control circuit 126, a deflection control circuit 128, a storage device 109 such as a magnetic disk drive, a monitor 117, and a memory 118. The deflection control circuit 128 is connected to DAC (digital-to-analog conversion) amplifiers 144, 146 and 148. The DAC amplifier 146 is connected to the main deflector 208, and the DAC amplifier 144 is connected to the sub deflector 209. The DAC amplifier 148 is connected to the deflector 218.

The detection circuit 106 is connected to a chip pattern memory 123 which is connected to the comparison circuit 108. The stage 105 is driven by a drive mechanism 142 under the control of the stage control circuit 114. In the drive mechanism 142, a drive system such as a three (x-, y-, and θ-) axis motor which provides drive in the directions of x, y, and θ in the stage coordinate system is configured, and therefore, the stage 105 can be moved in the x, y, and θ directions. A step motor, for example, can be used as each of these x, y, and θ motors (not shown). The stage 105 is movable in the horizontal direction and the rotation direction by the x-, y-, and θ-axis motors. The movement position of the stage 105 is measured by the laser length measuring system 122, and supplied (transmitted) to the position circuit 107. Based on the principle of laser interferometry, the laser length measuring system 122 measures the position of the stage 105 by receiving a reflected light from the mirror 216. In the stage coordinate system, the x, y, and θ directions are set, for example, with respect to a plane perpendicular to the optical axis (center axis of electron trajectory) of the multiple primary electron beams.

The electromagnetic lenses 202, 205, 206, 207 (objective lens), 224 and 226, and the ExB separator 214 are controlled by the lens control circuit 124. The collective blanking deflector 212 is composed of two or more electrodes (or poles), and each electrode is controlled by the blanking control circuit 126 through a DAC amplifier (not shown). The sub deflector 209 is composed of four or more electrodes (or poles), and each electrode is controlled by the deflection control circuit 128 through the DAC amplifier 144. The main deflector 208 is composed of four or more electrodes (or poles), and each electrode is controlled by the deflection control circuit 128 through the DAC amplifier 146. The deflector 218 is composed of four or more electrodes (or poles), and each electrode is controlled by the deflection control circuit 128 through the DAC amplifier 148.

To the electron gun 201, there is connected a high voltage power supply circuit (not shown). The high voltage power supply circuit applies an acceleration voltage between a filament (cathode) and an extraction electrode (anode) (which are not shown) in the electron gun 201. In addition to the applying the acceleration voltage, a voltage is applied to another extraction electrode (Wehnelt), and the cathode is heated to a predetermined temperature, and thereby, electrons from the cathode are accelerated to be emitted as an electron beam 200.

FIG. 1 shows configuration elements necessary for describing the first embodiment. It should be understood that other configuration elements generally necessary for the inspection apparatus 100 may also be included therein.

Figure 2:
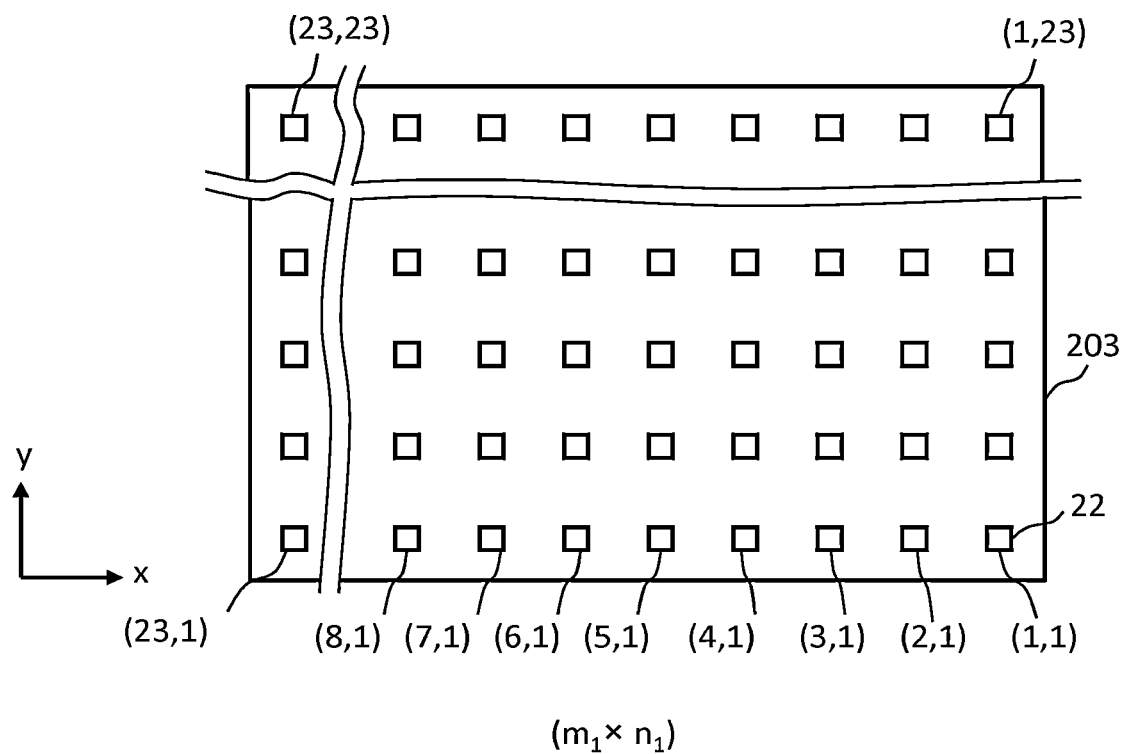
FIG. 2 is a conceptual diagram showing a configuration of a shaping aperture array substrate according to the first embodiment.

FIG. 2 is a conceptual diagram showing a configuration of a shaping aperture array substrate according to the first embodiment. As shown in FIG. 2, holes (openings) 22 of $m_1$ columns wide (width in the x direction) (each column in the y direction) and $n_1$ rows long (length in the y direction) (each row in the x direction) are two-dimensionally formed at a predetermined arrangement pitch in the shaping aperture array substrate 203, where one of $m_1$ and $n_1$ is an integer of 2 or more, and the other is an integer of 1 or more. In the case of FIG. 2, 23×23 holes (openings) 22 are formed. Ideally, each of the holes 22 is a rectangle (including a square) having the same dimension, shape, and size. Alternatively, ideally, each of the holes 22 may be a circle with the same outer diameter. $m_1 \times n_1$ (=N) multiple primary electron beams 20 are formed by letting portions of the electron beam 200 individually pass through a corresponding one of a plurality of holes 22.

Next, operations of the image acquisition mechanism 150 in the inspection apparatus 100 will be described below.

The electron beam 200 emitted from the electron gun 201 (emission source) is refracted by the electromagnetic lens 202, and illuminates the whole of the shaping aperture array substrate 203. As shown in FIG. 2, a plurality of holes 22 (openings) are formed in the shaping aperture array substrate 203. The region including all the plurality of holes 22 is irradiated by the electron beam 200. The multiple primary electron beams 20 are formed by letting portions of the electron beam 200 applied to the positions of the plurality of holes 22 individually pass through a corresponding one of the plurality of holes 22 in the shaping aperture array substrate 203.

The formed multiple primary electron beams 20 are individually refracted by the electromagnetic lenses 205 and 206, and travel to the electromagnetic lens 207 (objective lens), while repeating forming an intermediate image and a crossover, passing through the ExB separator 214 disposed at the crossover position of each beam (at the intermediate image position of each beam) of the multiple primary electron beams 20. Then, the electromagnetic lens 207 focuses the multiple primary electron beams 20 onto the substrate 101. The multiple primary electron beams 20 having been focused on the substrate 101 (target object) by the objective lens 207 are collectively deflected by the main deflector 208 and the sub deflector 209 to irradiate respective beam irradiation positions on the substrate 101. When all of the multiple primary electron beams 20 are collectively deflected by the collective blanking deflector 212, they deviate from the hole in the center of the limiting aperture substrate 213 and are blocked by the limiting aperture substrate 213. By contrast, the multiple primary electron beams 20 which were not deflected by the collective blanking deflector 212 pass through the hole in the center of the limiting aperture substrate 213 as shown in FIG. 1. Blanking control is provided by On/Off of the collective blanking deflector 212, and thus On/Off of the multiple beams is collectively controlled. In this way, the limiting aperture substrate 213 blocks the multiple primary electron beams 20 which were deflected to be in the "Off condition" by the collective blanking deflector 212. Then, the multiple primary electron beams 20 for inspection (for image acquisition) are formed by the beams having been made during a period from becoming "beam On" to becoming "beam Off" and having passed through the limiting aperture substrate 213.

When desired positions on the substrate 101 are irradiated with the multiple primary electron beams 20, a flux of secondary electrons (multiple secondary electron beams 300) including reflected electrons, each corresponding to each of the multiple primary electron beams 20, is emitted from the substrate 101 due to the irradiation with the multiple primary electron beams 20.

The multiple secondary electron beams 300 emitted from the substrate 101 travel to the E×B separator 214 through the electromagnetic lens 207.

The E×B separator 214 includes a plurality of more than two magnetic poles of coils, and a plurality of more than two, electrodes (poles). For example, the E×B separator 214 includes four magnetic poles (electromagnetic deflection coils) whose phases are mutually shifted by 90°, and four electrodes (electrostatic deflection electrodes) whose phases are also mutually shifted by 90°. For example, by setting two opposing magnetic poles to be an N pole and an S pole, a directive magnetic field is generated by these plurality of magnetic poles. Also, for example, by applying electrical potentials V whose signs are opposite to each other to the two opposing electrodes, a directive electric field is generated by these plurality of electrodes. Specifically, the E×B separator 214 generates an electric field and a magnetic field to be orthogonal to each other in a plane perpendicular to the traveling direction of the center beam (i.e., electron trajectory center axis) of the multiple primary electron beams 20. The electric field exerts a force in a fixed direction regardless of the traveling direction of electrons. In contrast, the magnetic field exerts a force according to Fleming's left-hand rule. Therefore, the direction of the force acting on (applied to) electrons can be changed depending on the entering (or "traveling") direction of electrons. With respect to the multiple primary electron beams 20 entering the E×B separator 214 from above, since the forces due to the electric field and the magnetic field cancel each other out, the beams 20 travel straight downward. In contrast, with respect to the multiple secondary electron beams 300 entering the E×B separator 214 from below, since both the forces due to the electric field and the magnetic field are exerted in the same direction, the multiple secondary electron beams 300 are bent obliquely upward, and separated from the multiple primary electron beams 20.

The multiple secondary electron beams 300 having been bent obliquely upward and separated from the multiple primary electron beams 20 are further bent by the deflector 218, and projected onto the multi-detector 222 while being refracted by the electromagnetic lenses 224 and 226. The multi-detector 222 detects the projected multiple secondary electron beams 300. Reflected electrons and secondary electrons may be projected on the multi-detector 222, or it is also acceptable that reflected electrons are diffused (emitted) along the way and remaining secondary electrons are projected. The multi-detector 222 includes a two-dimensional sensor. Then, each secondary electron of the multiple secondary electron beams 300 collides with its corresponding region of the two-dimensional sensor, thereby generating electrons, and secondary electron image data is generated for each pixel. In other words, in the multi-detector 222, a detection sensor is disposed for each primary electron beam of the multiple primary electron beams 20. Then, the detection sensor detects a corresponding secondary electron beam emitted by irradiation with each primary electron beam. Therefore, each of a plurality of detection sensors in the multi-detector 222 detects an intensity signal of a secondary electron beam for an image resulting from irradiation with an associated primary electron beam. The intensity signal detected by the multi-detector 222 is output to the detection circuit 106.

Figure 3:
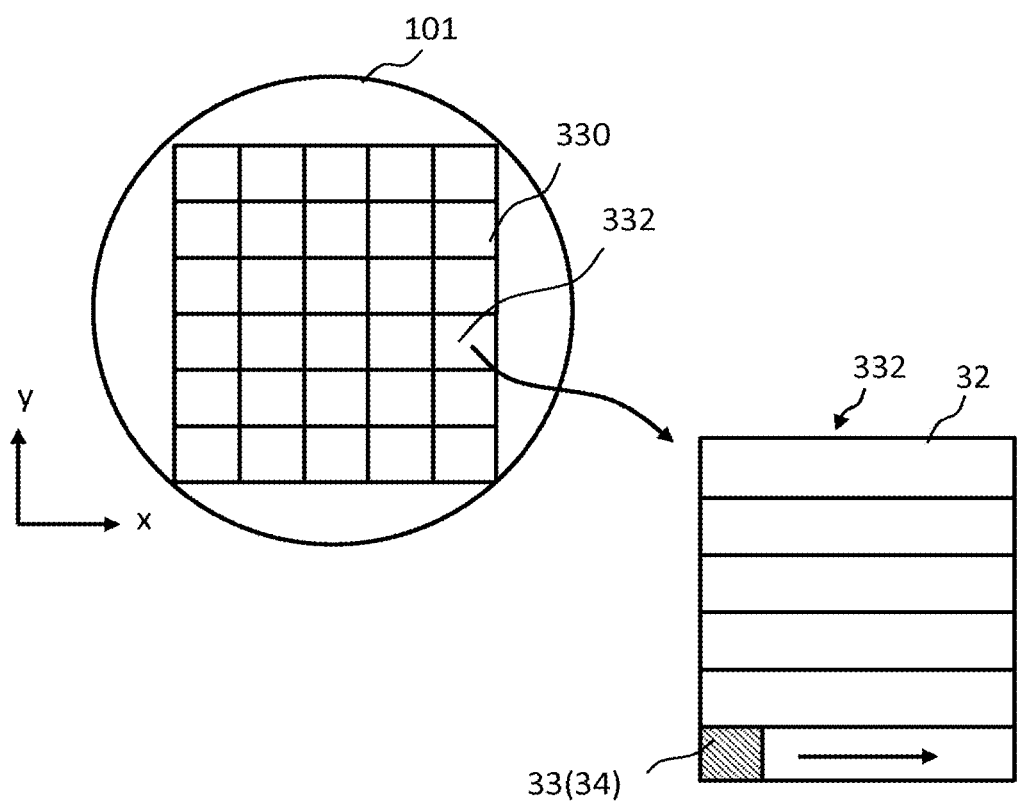
FIG. 3 is an illustration of an example of a plurality of chip regions formed on a semiconductor substrate according to the first embodiment.

FIG. 3 is an illustration of an example of a plurality of chip regions formed on a semiconductor substrate according to the first embodiment. In FIG. 3, in the case of the substrate 101 being a semiconductor substrate (wafer), a plurality of chips (wafer dies) 332 are formed in a two-dimensional array in an inspection region 330 of the semiconductor substrate (wafer). A mask pattern for one chip formed on an exposure mask substrate is reduced to, for example, ¼, and exposed/transferred onto each chip 332 by an exposure device, such as a stepper and a scanner, (not shown). The region of each chip 332 is divided, for example, in the y direction into a plurality of stripe regions 32 by a predetermined width. The scanning operation by the image acquisition mechanism 150 is carried out, for example, for each stripe region 32. The operation of scanning the stripe region 32 advances relatively in the x direction while the stage 105 is moved in the −x direction, for example. Each stripe region 32 is divided in the longitudinal direction into a plurality of rectangular (including square) regions 33. Beam application to a target rectangular region 33 is achieved by collectively deflecting all the multiple primary electron beams 20 by the main deflector 208.

Figure 4:
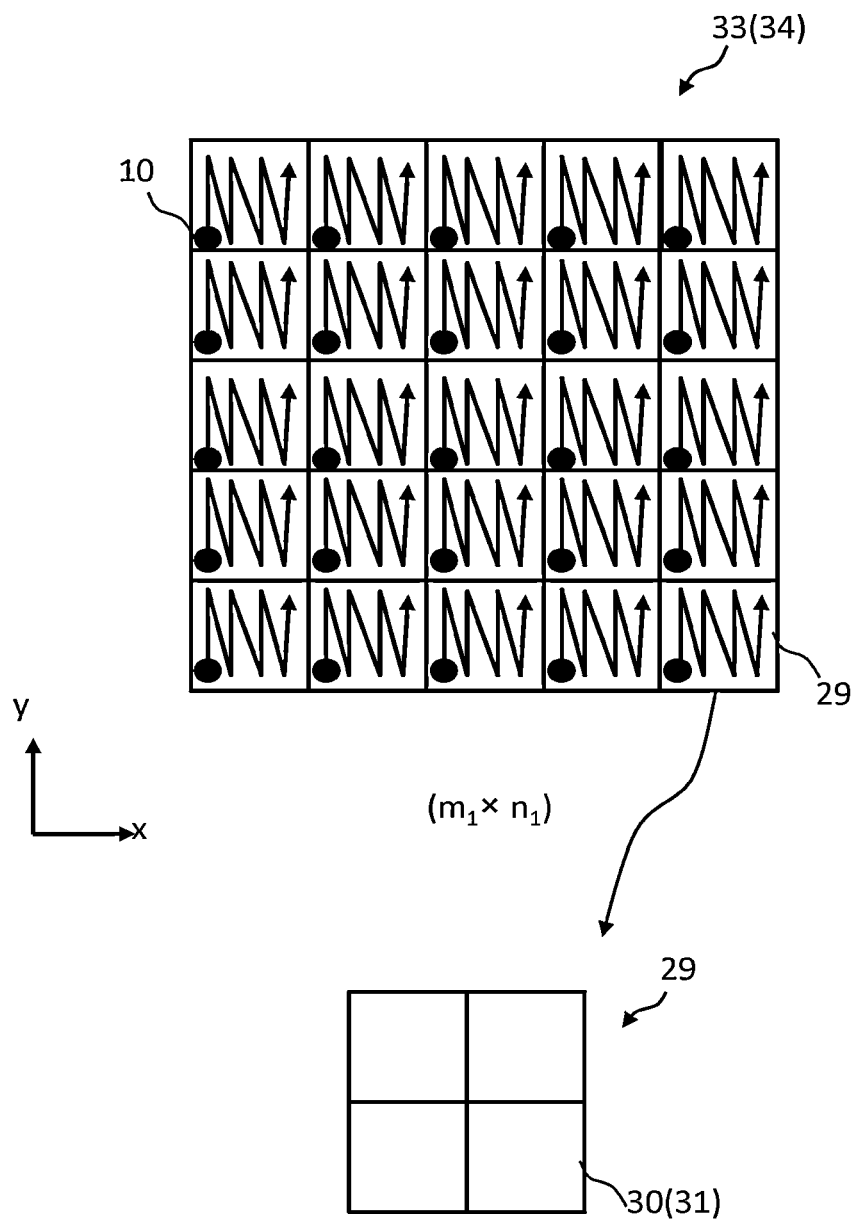
FIG. 4 is an illustration of a scanning operation with multiple beams according to the first embodiment.

FIG. 4 is an illustration of a scanning operation with multiple beams according to the first embodiment. FIG. 4 shows the case of multiple primary electron beams 20 of 5 rows×5 columns. The size of an irradiation region 34 which can be irradiated by one irradiation with the multiple primary electron beams 20 is defined by (the x-direction size obtained by multiplying the x-direction beam pitch of the multiple primary electron beams 20 on the substrate 101 by the number of x-direction beams)×(the y-direction size obtained by multiplying the y-direction beam pitch of the multiple primary electron beams 20 on the substrate 101 by the number of y-direction beams). Preferably, the width of each stripe region 32 is set to be the same as the size in the y direction of the irradiation region 34, or to be the size reduced by the width of the scanning margin. In the case of FIGS. 3 and 4, the irradiation region 34 and the rectangular region 33 are of the same size. However, it is not limited thereto. The irradiation region 34 may be smaller than the rectangular region 33, or larger than it. A sub-irradiation region 29, which is surrounded by the x-direction beam pitch and the y-direction beam pitch and in which the beam concerned itself is located, is irradiated and scanned (scanning operation) with each beam of the multiple primary electron beams 20. Each primary electron beam 10 of the multiple primary electron beams 20 is associated with any one of the sub-irradiation regions 29 which are different from each other. At the time of each shot, each primary electron beam 10 is applied to the same position in the associated sub-irradiation region 29. The primary electron beam 10 is moved in the sub-irradiation region 29 by collective deflection of all the multiple primary electron beams 20 by the sub deflector 209. By repeating this operation, the inside of one sub-irradiation region 29 is irradiated with one primary electron beam 10 in order. Then, when scanning of one sub-irradiation region 29 is completed, the irradiation position is moved to an adjacent rectangular region 33 in the same stripe region 32 by collectively deflecting all of the multiple primary electron beams 20 by the main deflector 208. By repeating this operation, the inside of the stripe region 32 is irradiated in order. After completing scanning of one stripe region 32, the irradiation position is moved to the next stripe region 32 by moving the stage 105 and/or by collectively deflecting all of the multiple primary electron beams 20 by the main deflector 208. As described above, a secondary electron image of each sub-irradiation region 29 is acquired by irradiation with each primary electron beam 10. By combining secondary electron images of respective sub-irradiation regions 29, a secondary electron image of the rectangular region 33, a secondary electron image of the stripe region 32, or a secondary electron image of the chip 332 is configured.

As shown in FIG. 4, each sub-irradiation region 29 is divided into a plurality of rectangular frame regions 30, and a secondary electron image (image to be inspected) in units of frame regions 30 is used for inspection. In the example of FIG. 4, one sub-irradiation region 29 is divided into four frame regions 30, for example. However, the number used for the dividing is not limited to four, and other number may be used for the dividing.

It is also preferable to group, for example, a plurality of chips 332 aligned in the x direction in the same group, and to divide each group into a plurality of stripe regions 32 by a predetermined width in the y direction, for example. Then, moving between stripe regions 32 is not limited to the moving in each chip 332, and it is also preferable to move in each group.

When the multiple primary electron beams 20 irradiate the substrate 101 while the stage 105 is continuously moving, the main deflector 208 executes a tracking operation by performing collective deflection so that the irradiation position of the multiple primary electron beams 20 may follow the movement of the stage 105. Therefore, the emission position of the multiple secondary electron beams 300 changes every second with respect to the trajectory central axis of the multiple primary electron beams 20. Similarly, when the inside of the sub-irradiation region 29 is scanned, the emission position of each secondary electron beam changes every second in the sub-irradiation region 29. Thus, the deflector 218 collectively deflects the multiple secondary electron beams 300 so that each secondary electron beam whose emission position has changed as described above may be applied to a corresponding detection region of the multi-detector 222.

Figure 5:
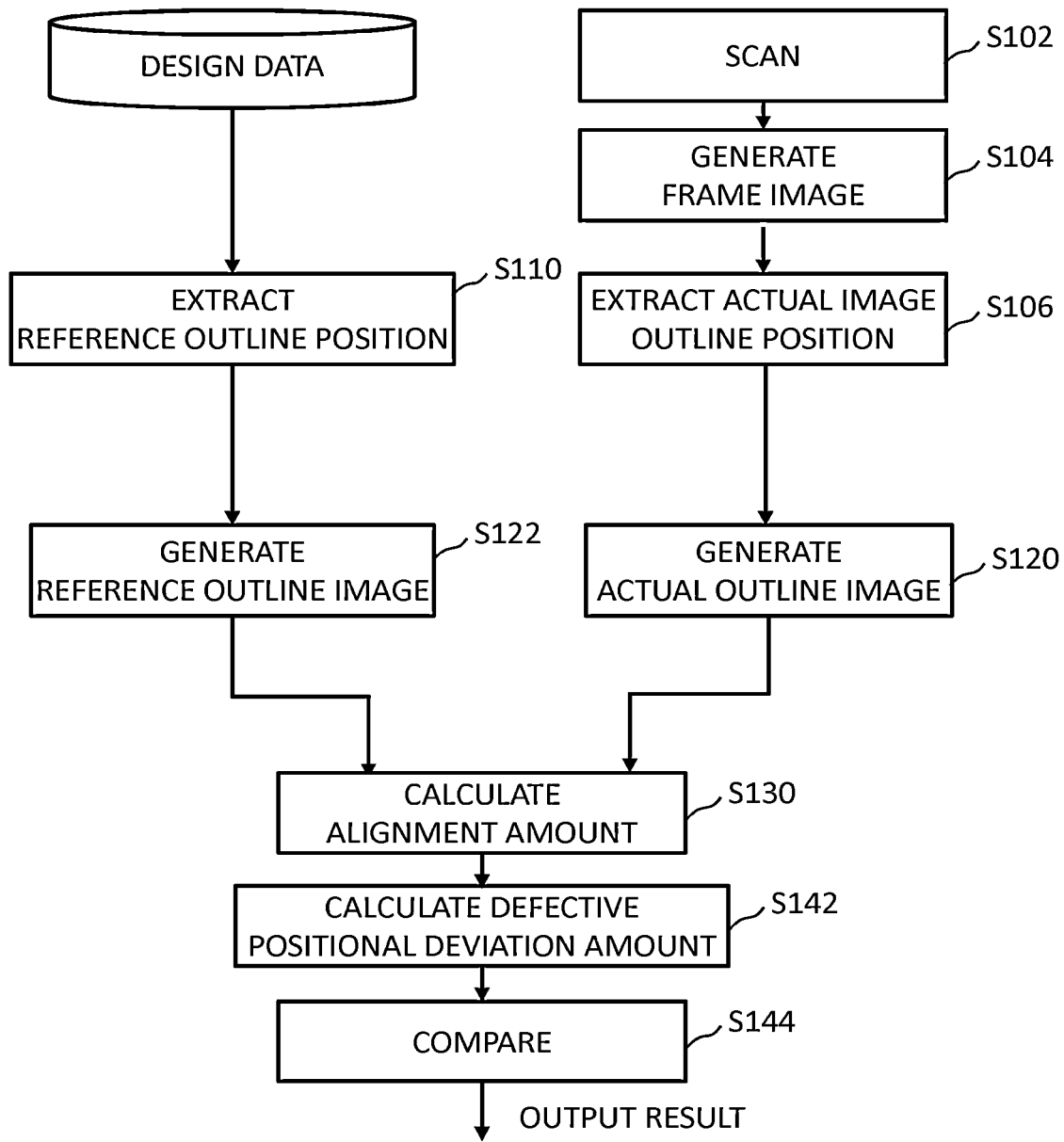
FIG. 5 is a flowchart showing main steps of an inspection method according to the first embodiment.

FIG. 5 is a flowchart showing main steps of an inspection method according to the first embodiment. In FIG. 5, the inspection method of the first embodiment executes a series of steps: a scanning step (S102), a frame image generation step (S104), an actual image outline position extraction step (S106), a reference outline position extraction step (S110), an actual outline image generation step (S120), a reference outline image generation step (S122), an alignment amount calculation step (S130), a defective positional deviation amount calculation step (S142), and a comparison step (S144).

In the scanning step (S102), the image acquisition mechanism 150 acquires an image of the substrate 101 on which a figure pattern has been formed. Specifically, the image acquisition mechanism 150 irradiates the substrate 101, on which a plurality of figure patterns has been formed, with the multiple primary electron beams 20 to acquire a secondary electron image of the substrate 101 by detecting the multiple secondary electron beams 300 emitted from the substrate 101 due to the irradiation with the multiple primary electron beams 20. As described above, reflected electrons and secondary electrons may be projected on the multi-detector 222, or alternatively, reflected electrons are diffused along the way, and only remaining secondary electrons (the multiple secondary electron beams 300) may be projected thereon.

As described above, the multiple secondary electron beams 300 emitted from the substrate 101 due to the irradiation with the multiple primary electron beams 20 are detected by the multi-detector 222. Detected data (measured image data: secondary electron image data: inspection image data) on the secondary electron of each pixel in each sub irradiation region 29 detected by the multi-detector 222 is output to the detection circuit 106 in order of measurement. In the detection circuit 106, the detected data in analog form is converted into digital data by an A-D converter (not shown), and stored in the chip pattern memory 123. Then, acquired measured image data is transmitted to the comparison circuit 108, together with information on each position from the position circuit 107.

Figure 6:
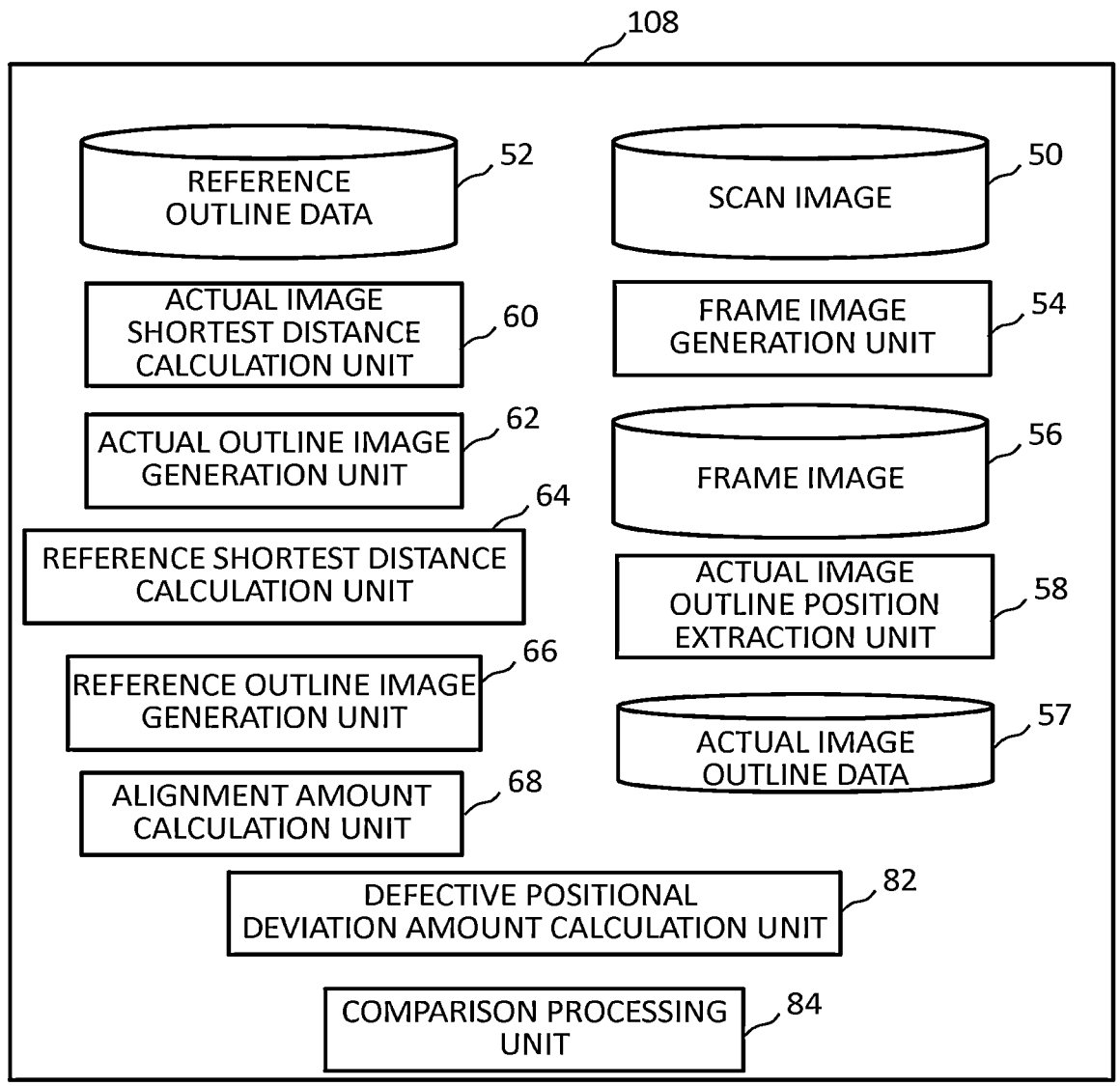
FIG. 6 is a block diagram showing an example of a configuration in a comparison circuit according to the first embodiment.

FIG. 6 is a block diagram showing an example of a configuration in a comparison circuit according to the first embodiment. In FIG. 6, in the comparison circuit 108 of the first embodiment, there are arranged storage devices 50, 52, 56, and 57 such as magnetic disk drives, a frame image generation unit 54, an actual image outline position extraction unit 58, an actual image shortest distance calculation unit 60, an actual outline image generation unit 62, a reference shortest distance calculation unit 64, a reference outline image generation unit 66, an alignment amount calculation unit 68, a defective positional deviation amount calculation unit 82 and a comparison processing unit 84. Each of the "units" such as the frame image generation unit 54, the actual image outline position extraction unit 58, the actual image shortest distance calculation unit 60, the actual outline image generation unit 62, the reference shortest distance calculation unit 64, the reference outline image generation unit 66, the alignment amount calculation unit 68, the defective positional deviation amount calculation unit 82 and the comparison processing unit 84 includes processing circuitry. The processing circuitry includes, for example, an electric circuit, computer, processor, circuit board, quantum circuit, semiconductor device, or the like. Further, common processing circuitry (the same processing circuitry), or different processing circuitry (separate processing circuitry) may be used for each of the "units". Input data required in the frame image generation unit 54, the actual image outline position extraction unit 58, the actual image shortest distance calculation unit 60, the actual outline image generation unit 62, the reference shortest distance calculation unit 64, the reference outline image generation unit 66, the alignment amount calculation unit 68, the defective positional deviation amount calculation unit 82, and the comparison processing unit 84, and calculated results are stored in a memory (not shown) or in the memory 118 each time.

The measured image data (scan image) transmitted into the comparison circuit 108 is stored in the storage device 50.

In the frame image generation step (S104), the frame image generation unit 54 generates a frame image 31 of each of a plurality of frame regions 30 obtained by further dividing the image data of the sub-irradiation region 29 acquired by a scanning operation with each primary electron beam 10. In order to prevent missing an image, it is preferable that margin regions overlap each other in respective frame regions 30. The generated frame image 31 is stored in the storage device 56.

In the actual image outline position extraction step (S106), the actual image outline position extraction unit 58 extracts, for each frame image 31, a plurality of outline positions (actual image outline positions) of each figure pattern in the frame image 31 concerned.

Figure 7:
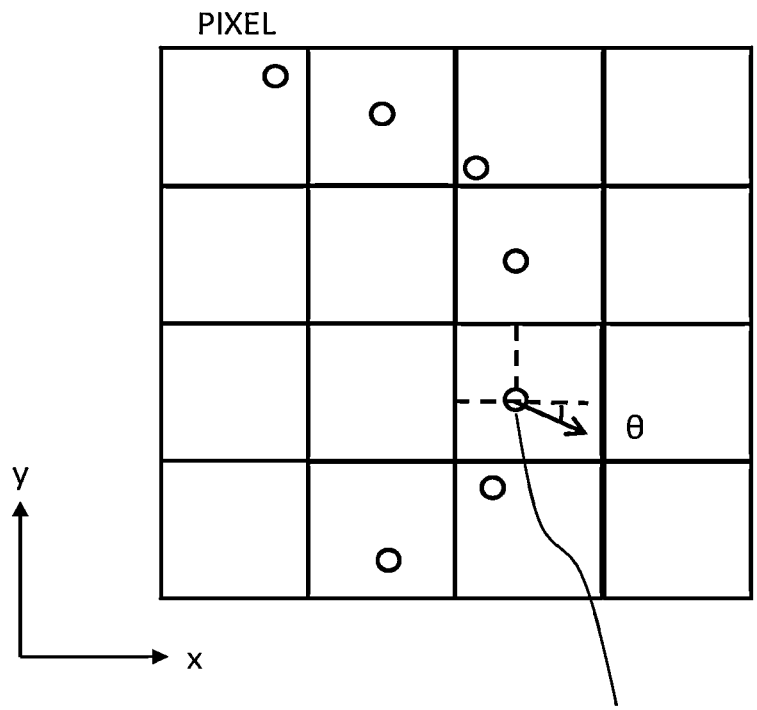
FIG. 7 is a diagram showing an example of an actual image outline position according to the first embodiment.

FIG. 7 is a diagram showing an example of an actual image outline position according to the first embodiment. The method for extracting an outline position may be the conventional one. For example, differential filter processing for differentiating each pixel in the x and y directions by using a differentiation filter, such as a Sobel filter is performed to combine x-direction and y-direction primary differential values. Then, the peak position of a profile using the combined primary differential values is extracted as an outline position on an outline (actual image outline). FIG. 7 shows the case where one outline position is extracted for each of a plurality of outline pixels through which an actual image outline passes. The outline position is extracted per sub-pixel in each outline pixel. In the example of FIG. 7, the outline position is represented by coordinates (x, y) in a pixel. Further, shown is a normal direction angle θ at each outline position of the outline approximated by fitting a plurality of outline positions by a predetermined function. The normal direction angle θ is defined by a clockwise angle to the x axis. Information on each obtained actual image outline position (actual image outline data) is stored in the storage device 57.

In the reference outline position extraction step (S110), reference outline position extraction circuit 112 extracts a plurality of reference outline positions for comparing with a plurality of actual image outline positions. A reference outline position may be extracted from design data. Alternatively, first, a reference image is generated from design data, and a reference outline position may be extracted using the reference image by the same method as that of the case of the frame image 31 being a measured image. Alternatively, a plurality of reference outline positions may be extracted by the other conventional method.

Figure 8:
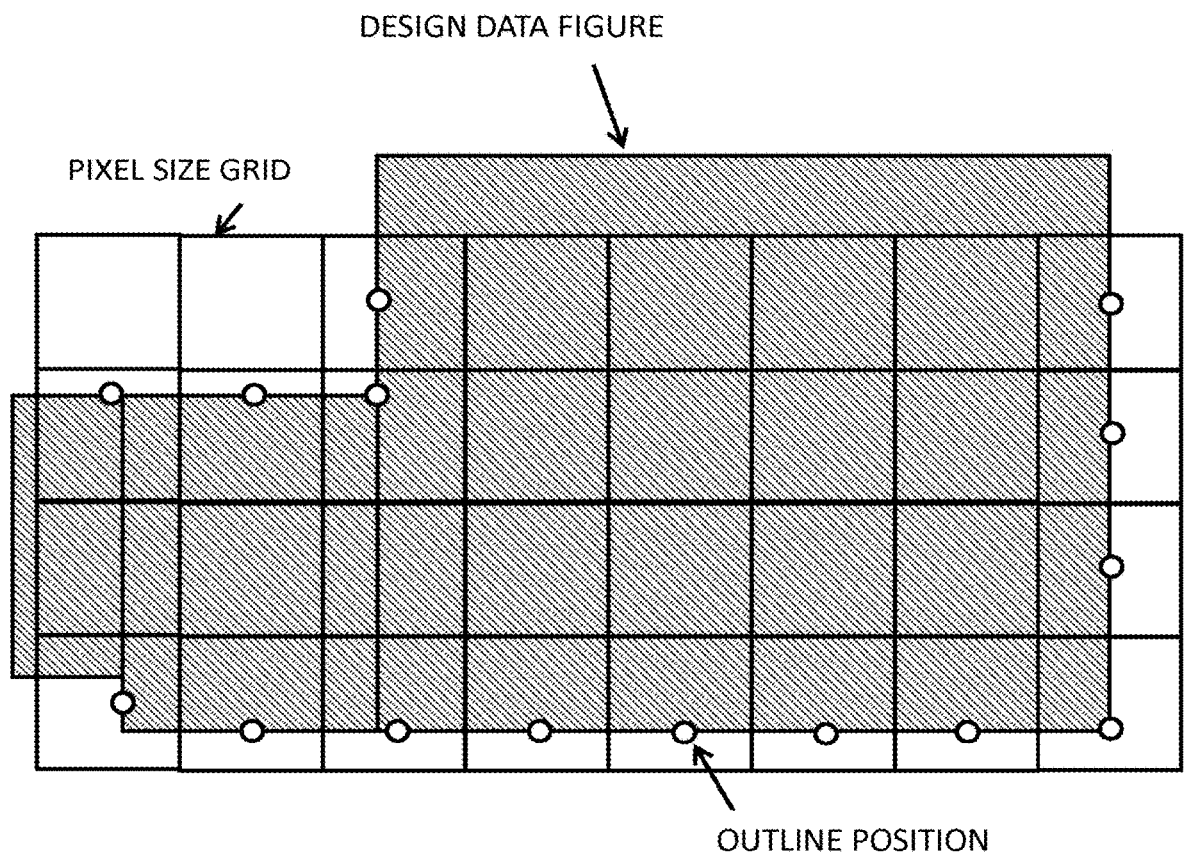
FIG. 8 is a diagram for explaining an example of a method for extracting a reference outline position according to the first embodiment.

FIG. 8 is a diagram for explaining an example of a method for extracting a reference outline position according to the first embodiment. The case of FIG. 8 shows an example of a method for extracting a reference outline position from design data. In FIG. 8, the reference outline position extraction circuit 112 reads design pattern data (design data) being a basis of a pattern formed on the substrate 101 from the storage device 109. The reference outline position extraction circuit 112 sets grids, each being the size of a pixel, for the design data. The midpoint of a straight line in a quadrangle corresponding to a pixel is defined as a reference outline position. If there is a corner of a figure pattern, the corner vertex is defined as a reference outline position. If there are a plurality of corners, the intermediate point of the corner vertices is defined as a reference outline position. By the process described above, the outline position of a figure pattern as a design pattern in the frame region 30 can be extracted with sufficient accuracy. Information (reference outline data) on each obtained reference outline position is output to the comparison circuit 108. Then, in the comparison circuit 108, reference outline data is stored in the storage device 52.

Figure 9:
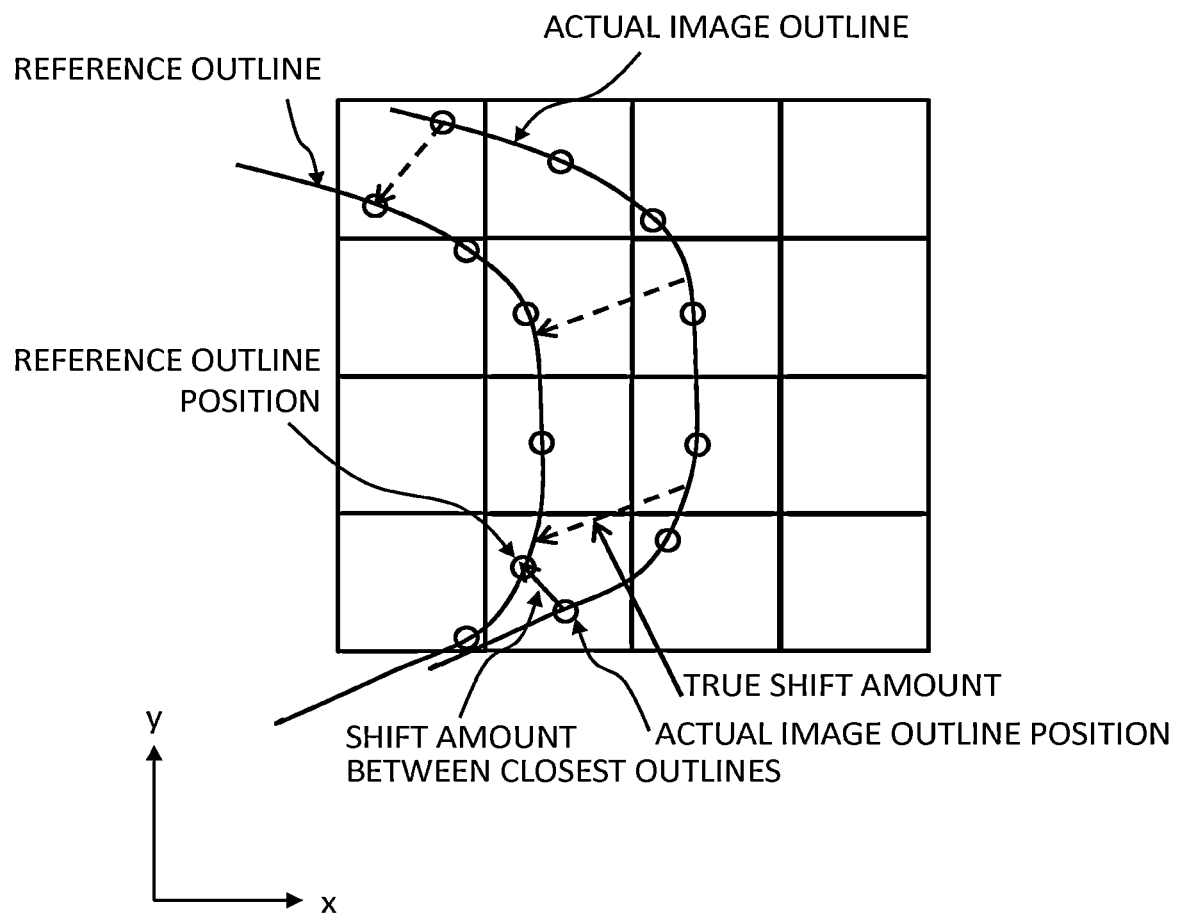
FIG. 9 is a diagram for explaining an example of an alignment amount according to a comparative example 1 of the first embodiment 1.

FIG. 9 is a diagram for explaining an example of an alignment amount according to a comparative example 1 of the first embodiment 1.FIG. 9 shows a portion of an outline (actual image outline) in the frame image 31 used as an image to be inspected, and a portion of a reference outline extracted from design data. The case of FIG. 9 shows an actual image outline connecting a plurality of outline positions (actual image outline positions) extracted from the frame image 31, and a reference outline connecting a plurality of outline positions (reference outline positions) extracted from design data. In the comparative example 1 of the first embodiment 1, a shift amount from an actual image outline position to the closest reference outline position is treated as an alignment amount. In the case of the comparative example 1, a true shift amount is not necessarily the same as a relative distance between outline positions. Therefore, an error occurs between a shift amount from an actual image outline position to the closest reference outline position (that is, a shift amount between closest outline positions) and a true shift amount. In particular, when a shift amount is large, an error appears notably large. In order to obtain a correct/accurate shift amount, it is necessary to estimate a highly accurate actual image outline instead of an actual image outline just connecting a plurality of actual image outline positions. The same applies to a reference outline. For estimating a highly accurate outline, a complicated calculation is needed, and therefore, the processing takes a long time. By contrast, if the accuracy of a shift amount deteriorates, false defects increase, and thus, it becomes difficult to perform an inspection with great accuracy. Then, according to the first embodiment, not directly performing alignment between outlines, but generating an outline image in which the gray scale value (pixel value) of each pixel is defined using a predetermined function, alignment is performed between outline images by using the pixel value. It is specifically described below.

In the actual outline image generation step (S120), first, with respect to each pixel in the frame region 30 (predetermined region) including a plurality of actual image outline positions on an actual image outline of a figure pattern in the frame image 31 (inspection image), the actual image shortest distance calculation unit 60 calculates a distance L from the center of the pixel concerned to the closest actual image outline position in a plurality of actual image outline positions.

Figures 10A, 10B:
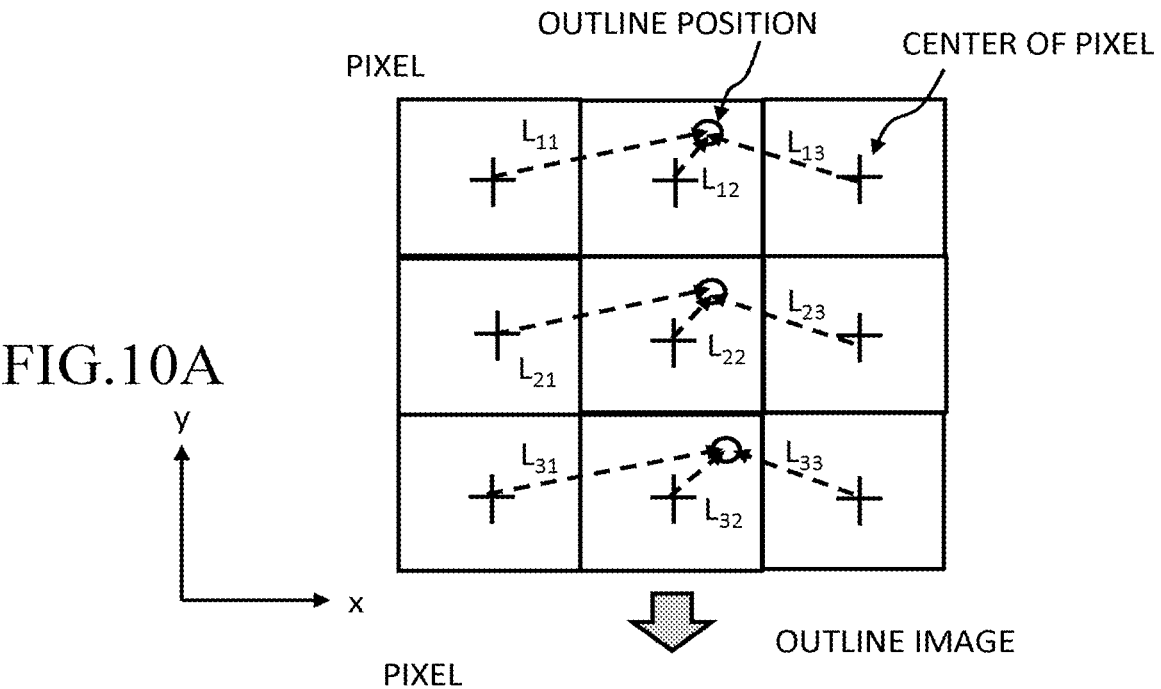
FIGS. 10A and 10B are diagrams for explaining an outline image according to the first embodiment.

FIGS. 10A and 10B are diagrams for explaining an outline image according to the first embodiment. In each example of FIGS. 10A and 10B, a region of 3×3 pixels is shown. One outline position is extracted for each of a plurality of pixels through which an outline passes. In the case of FIG. 10A, one outline position is shown in the middle of each pixel row in the x direction being arrayed in the y direction. The actual image shortest distance calculation unit 60 calculates the distance L from the center of each of the 3×3 pixels to the closest outline position. Thereby, a distance $L_{ij}$ can be acquired for each pixel. ij indicates coordinates (index) of a pixel.

Next, the actual outline image generation unit 62 generates an actual outline image of the frame region 30 defined by a predetermined function, whose derivative is substantially continuous and in which the gray scale value of each pixel in the frame region 30 including a plurality of actual image outline positions on an actual image outline of a figure pattern in the frame image 31 is dependent on the distance $L_{ij}$ from the center of the pixel concerned to the closest actual image outline position in a plurality of actual image outline positions. According to the first embodiment, an actual outline image indicating outline positions is generated based on outline data. It is preferable that a Gaussian function is used as the predetermined function whose derivative is substantially continuous. The Gaussian function F(L) can be defined, as an example, by the following equation (1) using a distance $L_{ij}$, an amplitude A, and a standard deviation σ.

$$F(L_{ij}) = A \cdot \exp(-L_{ij}^2 / 2\sigma^2) \tag{1}$$

The amplitude A and the standard deviation σ can be set as appropriate. In the case of defining the gray scale value of each pixel of an outline image by unsigned 8 bits (0 to 255 gray scale levels), preferably, the amplitude A is set to be 255, for example. σ is a value indicating the spread of an outline image profile, and in general, the larger its numerical value, the smaller an error in a shift operation. However, if the minimum line width of a figure pattern or the minimum spacing between figure patterns becomes narrow, the bottom portion of the outline image profile and its adjacent outline overlap with each other, and therefore, an error occurs. Accordingly, σ is preferably set to be about ⅓ of the minimum line width or the minimum spacing of the figure pattern.

As shown in FIG. 10B, the value obtained by the Gaussian function F(L), for example, is defined as the gray scale value of each pixel. Thereby, the outline can be defined as a gray scale image.

In the reference outline image generation step (S122), first, with respect to each pixel in a frame region in the frame image 31 (inspection image), the reference shortest distance calculation unit 64 calculates a distance L from the center of the pixel concerned to the closest reference outline position in a plurality of reference outline positions to be compared with an actual outline. The method for calculating the distance L is similar to the case of obtaining the distance to the actual image outline position shown in FIG. 10A.

Next, the reference outline image generation unit 66 generates a reference outline image of the frame region 30 defined by the above-described predetermined function shown in FIG. 10B, in which the gray scale value of each pixel in the frame region 30 (predetermined region) is dependent on the distance L from the center of the pixel concerned to the closest reference outline position in a plurality of reference outline positions on a reference outline to be compared with an actual image outline.

Figure 11:
FIG. 11 is a table showing an example of an alignment calculation result between outline images according to the first embodiment.

In the alignment amount calculation step (S130), the alignment amount calculation unit 68 calculates an alignment amount for performing alignment between an actual outline image and a reference outline image by employing an evaluation function which uses a gray scale difference between the actual outline image and the reference outline image. Specifically, it operates as follows:

FIG. 11 is a table showing an example of an alignment calculation result between outline images according to the first embodiment. The alignment amount calculation unit 68 shifts at least one of an actual outline image and a reference outline image while changing the shift amount between the actual outline image and the reference outline image, and obtains the shift amount, as an alignment amount, that makes a sum of squared differences (SSD) between the gray scale value of the actual outline image and the gray scale value of the reference outline image in each shift amount smaller than others. Therefore, FIG. 11 shows an example of an SSD calculation result at each position shifted per pixel in the x and y directions. In the case of FIG. 11, when the shift amount is x=1 pixel and y=1 pixel, the SSD calculation result is the minimum value. An outline image is shifted using the shift amount per pixel obtained described above, and then, by similarly performing shifting per sub pixel, an SSD is calculated at each position. The alignment amount calculation unit 68 calculates and obtains the shift amount that makes the sum of squared differences (SSD) per sub pixel smaller than others. Then, the shift amount per sub pixel is added to the shift amount per pixel described above to calculate a final alignment amount.

In the defective positional deviation amount calculation step (S142), the defective positional deviation amount calculation unit 82 calculates a defective positional deviation amount in consideration of an alignment amount between each of a plurality of actual image outline positions and its closest reference outline position.

Figure 12:
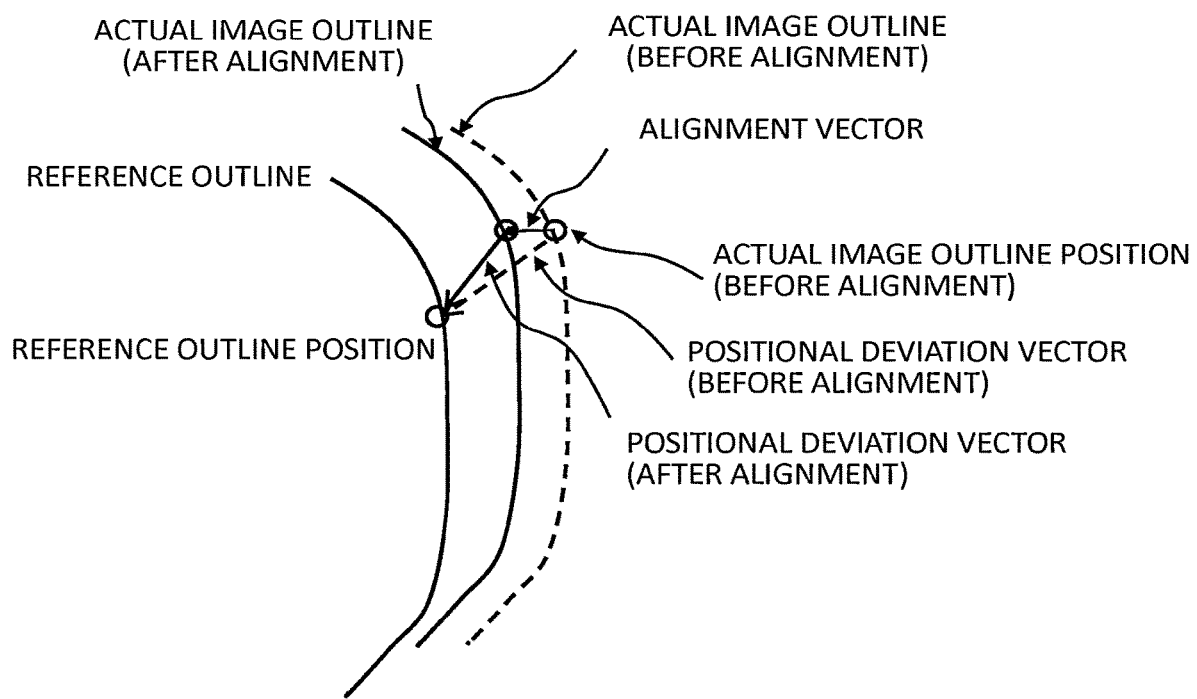
FIG. 12 is an illustration for explaining a positional deviation amount in consideration of an alignment amount according to the first embodiment.

FIG. 12 is an illustration for explaining a positional deviation amount in consideration of an alignment amount according to the first embodiment. In order to accurately inspect whether a defect exists in an outline itself, it is necessary to perform an alignment with high precision between an actual image outline of the frame image 31 and a reference outline. According to the first embodiment, the defective positional deviation amount calculation unit 82 calculates a defective positional deviation amount (defective positional deviation vector (after alignment)) by subtracting an alignment amount (alignment vector) from a positional deviation amount (positional deviation vector (before alignment)) between an actual image outline position before alignment and a reference outline position. Thereby, the same effect as image alignment can be acquired.

In the comparison step (S144), the comparison processing unit 84 (comparison unit) compares, using an alignment amount, an actual image outline with a reference outline. Specifically, the comparison processing unit 84 determines it as a defect when the magnitude (distance) of a defective positional deviation vector in consideration of an alignment amount between each of a plurality of actual image outline positions and its corresponding reference outline position exceeds a determination threshold. The comparison result is output to the storage device 109, the monitor 117, or the memory 118.

Figure 13A:
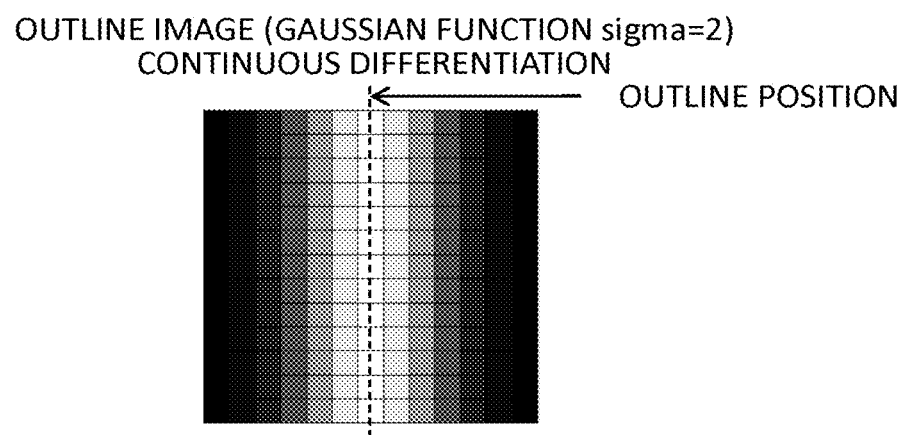
FIGS. 13A and 13B are diagrams showing an example of an outline position estimated based on an actual outline image according to the first embodiment.
Figure 13B:
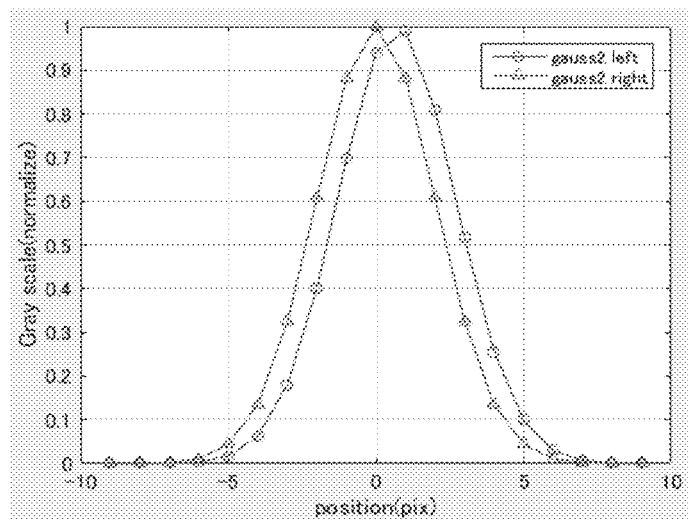

FIGS. 13A and 13B are diagrams showing an example of an outline position estimated based on an actual outline image according to the first embodiment. FIG. 13A shows an example of an actual outline image of a portion of a figure pattern right side outline, where gray scale values of pixel values are represented by graded colors. FIG. 13B shows an x-direction image profile. According to the first embodiment, since a value calculated based on a function (e.g. Gaussian function) whose derivative is approximately continuous is used for the gray scale value of each pixel of an actual outline image, it is possible to interpolate with a smooth curve when performing shift processing. Therefore, an error can be made small when an SSD value is calculated. Thus, in the alignment processing between an actual outline image and a reference outline image according to the first embodiment, it is possible to make the error small.

Figure 14A:
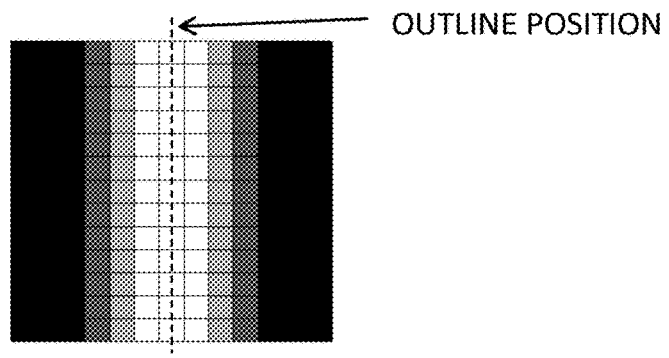
FIGS. 14A and 14B are diagrams showing an example of an outline position estimated based on an actual outline image according to a comparative example 2 of the first embodiment.
Figure 14B:
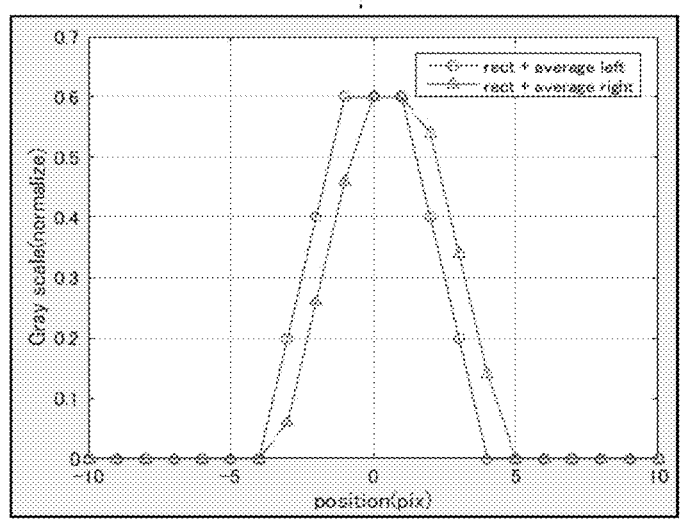

FIGS. 14A and 14B are diagrams showing an example of an outline position estimated based on an actual outline image according to a comparative example 2 of the first embodiment. FIG. 14A shows an actual outline image in which each pixel value is defined by a function whose derivative is discontinuous, such as a rectangular function not by a function (e.g. Gaussian function) whose derivative is continuous, where gray scale values of pixel values are represented by graded colors. FIG. 14B shows an x-direction image profile. The rectangular function is defined by the following equation (2), for example.

$$F(L) = A \cdot \max(0, \min(1, S - \mathrm{abs}(L))) \quad (2)$$

where, S: size of rectangle (S≥1, e.g., 3), A: amplitude (e.g., 255), min(x, y): the smaller one of x and y, max(x, y): the larger one of x and y, and abs(x): absolute value of x.

Next, in order to prevent an interpolation error of the rectangular function described above, averaging processing using 3×3 pixels is performed. Specifically, with respect to each of all the pixels of the outline image obtained by the rectangular function described above, the average value is calculated among nine pixels acquired by each pixel added by eight vertically, horizontally, and diagonally adjacent pixels. Then, the obtained average value is defined as a pixel value of the final outline image (equivalent to the conventional example image of FIGS. 14A and 14B).

Since, in the comparative example 2, a calculation result by a rectangular function, etc. whose derivative is discontinuous is used, it is difficult to interpolate with a smooth curve when performing shift processing. Therefore, the error of the SSD calculation becomes large.

Figure 15:
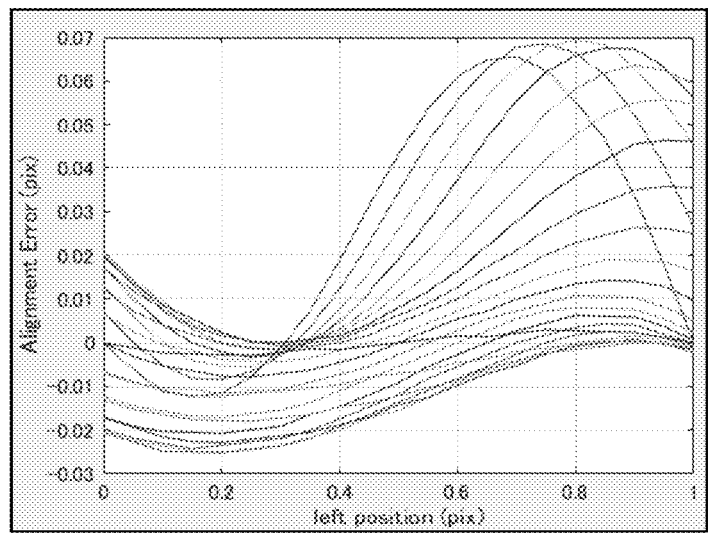
FIG. 15 is a diagram showing an example of a shift amount error according to the comparative example 2 of the first embodiment.
Figure 16:
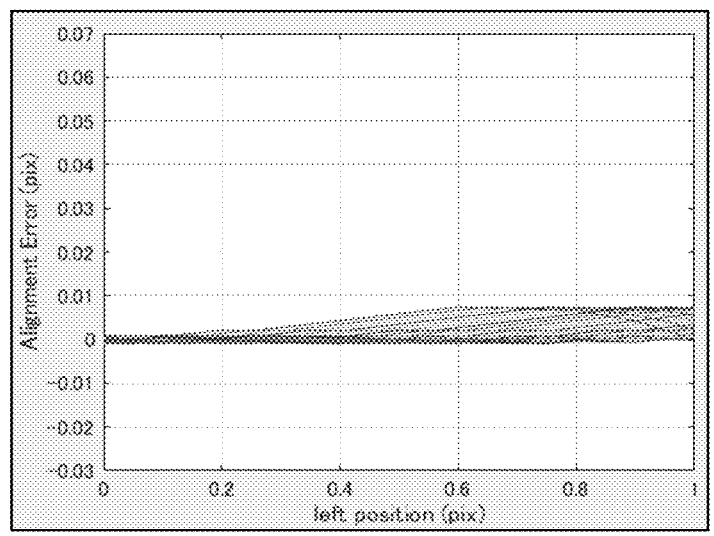
FIG. 16 is a diagram showing an example of a shift amount error according to the first embodiment.

FIG. 15 is a diagram showing an example of a shift amount error according to the comparative example 2 of the first embodiment. FIG. 16 is a diagram showing an example of a shift amount error according to the first embodiment. In FIGS. 15 and 16, a one-dimensional image profile is generated to show a result of measuring an error between a true shift amount and a shift amount by an SSD. Here, positions of a reference image and an image to be shifted are shifted to change in units of sub pixels (0 to 1 pixel) to show a result of measuring errors with respect to all the combinations between them. In data series of FIGS. 15 and 16, the positions of the images to be shifted are based on the same conditions. The abscissa axis represents the position (unit: pixel) of the reference image, and the ordinate axis represents an alignment error (unit: pixel). As shown in FIG. 15, in the comparative example 2, the maximum error is 0.0695 pixel. By contrast, as shown in FIG. 16, in the first embodiment, the maximum error is suppressed to 0.0074 pixel. According to the first embodiment, since the function (for example, Gaussian function) whose derivative is approximately continuous is used, the error of interpolation in the case of performing shift processing is small, and therefore, the alignment error can be made substantially small.

As described above, according to the first embodiment, the alignment amount between outlines can be calculated as an alignment amount between images using gray scale values of pixels obtained based on the function whose derivative is substantially continuous. Therefore, a highly precise deviation amount can be acquired while suppressing the processing time.

In the above description, a series of " . . . circuits" includes processing circuitry. The processing circuitry includes an electric circuit, computer, processor, circuit board, quantum circuit, semiconductor device, or the like. Each " . . . circuit" may use common processing circuitry (the same processing circuitry), or different processing circuitry (separate processing circuitry). A program for causing a processor, etc. to execute processing may be stored in a recording medium, such as a magnetic disk drive, flush memory, etc. For example, the position circuit 107, the comparison circuit 108, the reference outline position extraction circuit 112, the stage control circuit 114, the lens control circuit 124, the blanking control circuit 126, and the deflection control circuit 128 may be configured by at least one processing circuit described above.

Embodiments have been explained referring to specific examples described above. However, the present invention is not limited to these specific examples. Although FIG. 1 shows the case where the multiple primary electron beams 20 are formed by the shaping aperture array substrate 203 irradiated with one beam from the electron gun 201 serving as an irradiation source, it is not limited thereto. The multiple primary electron beams 20 may be formed by irradiation with a primary electron beam from each of a plurality of irradiation sources.

While the apparatus configuration, control method, and the like not directly necessary for explaining the present invention are not described, some or all of them can be appropriately selected and used on a case-by-case basis when needed.

In addition, any pattern inspection apparatus, and method for acquiring an alignment amount between outlines that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
   an image acquisition mechanism configured to acquire an inspection image of a substrate on which a figure pattern is formed;
   an actual outline image generation circuit configured to generate an actual outline image of a predetermined region defined by a predetermined function, in which the predetermined function defines a gray scale value of each pixel in the predetermined region including a plurality of actual image outline positions on an actual image outline of the figure pattern in the inspection image is dependent on a distance from a center of a pixel concerned to a closest actual image outline position in the plurality of actual image outline positions;
   a reference outline image generation circuit configured to generate a reference outline image of the predetermined region defined by the predetermined function, in which the predetermined function defines a gray scale value of each pixel in the predetermined region is dependent on a distance from a center of a pixel concerned to a closest reference outline position in a plurality of reference outline positions on a reference outline to be compared with the actual image outline;
   an alignment amount calculation circuit configured to calculate an alignment amount for performing alignment between the actual outline image and the reference outline image by using a gray scale difference between the actual outline image and the reference outline image; and a comparison circuit configured to compare the actual image outline with the reference outline by using the alignment amount, wherein a derivative of the predetermined function is substantially continuous.

2. The apparatus according to claim 1, wherein the alignment amount calculation circuit shifts at least one of the actual outline image and the reference outline image while changing a shift amount between the actual outline image and the reference outline image, and calculates the shift amount, as the alignment amount, that makes a sum of squared differences between a gray scale value of the actual outline image and a gray scale value of the reference outline image in each shift amount smaller than others.

3. The apparatus according to claim 1, wherein the predetermined function is a Gaussian function.

4. The apparatus according to claim 1 further comprising:
an actual image outline position extraction circuit configured to extract, for each predetermined region, the plurality of actual image outline positions of each figure pattern in the inspection image concerned.

5. A method for acquiring an alignment amount between outlines comprising:
acquiring an inspection image of a substrate on which a figure pattern is formed;
generating an actual outline image of a predetermined region defined by a predetermined function, in which the predetermined function defines a gray scale value of each pixel in the predetermined region including a plurality of actual image outline positions on an actual image outline of the figure pattern in the inspection image is dependent on a distance from a center of a pixel concerned to a closest actual image outline position in the plurality of actual image outline positions;
generating a reference outline image of the predetermined region defined by the predetermined function, in which the predetermined function defines a gray scale value of each pixel in the predetermined region is dependent on a distance from a center of a pixel concerned to a closest reference outline position in a plurality of reference outline positions on a reference outline to be compared with the actual image outline; and
calculating an alignment amount for performing alignment between the actual outline image and the reference outline image by using a gray scale difference between the actual outline image and the reference outline image, and outputting a result,
wherein a derivative of the predetermined function is substantially continuous.

6. The method according to claim 5 further comprising:
shifting at least one of the actual outline image and the reference outline image while changing a shift amount between the actual outline image and the reference outline image, and calculating the shift amount, as the alignment amount, that makes a sum of squared differences between a gray scale value of the actual outline image and a gray scale value of the reference outline image in each shift amount smaller than others.

7. The method according to claim 5, wherein the predetermined function is a Gaussian function.

8. The method according to claim 5 further comprising:
extracting, for each predetermined region, the plurality of actual image outline positions of each figure pattern in the inspection image concerned.

* * * * *